(12) United States Patent
Ishihara et al.

(10) Patent No.: US 6,895,832 B2
(45) Date of Patent: *May 24, 2005

(54) POWER TRANSMISSION SYSTEM

(75) Inventors: Sunao Ishihara, Saitama-ken (JP); Kenji Matsuda, Saitama-ken (JP); Toshiharu Kumagai, Saitama-ken (JP); Isamu Sunaga, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/420,722

(22) Filed: Apr. 23, 2003

(65) Prior Publication Data

US 2003/0230156 A1 Dec. 18, 2003

(30) Foreign Application Priority Data

Apr. 24, 2002 (JP) ........................................ 2002-123039
Apr. 2, 2003 (JP) ........................................ 2003-098943

(51) Int. Cl.⁷ ................................................. F16H 3/08
(52) U.S. Cl. ............................. 74/325; 74/331; 74/333; 74/335; 74/339; 192/53.32; 192/53.34; 192/53.343
(58) Field of Search .......................... 74/325, 331, 333, 74/335, 339; 192/53.32, 53.34, 53.343

(56) References Cited

U.S. PATENT DOCUMENTS

| | | | | |
|---|---|---|---|---|
| 4,544,057 A | * | 10/1985 | Webster et al. ................ 477/86 |
| 4,594,908 A | * | 6/1986 | Akashi et al. ................ 74/359 |
| 4,627,312 A | * | 12/1986 | Fujieda et al. ............... 477/124 |
| 5,313,856 A | * | 5/1994 | Schneider et al. ............ 477/80 |
| 5,761,961 A | * | 6/1998 | Krauss et al. ................. 74/333 |
| 6,550,352 B2 | * | 4/2003 | Okada et al. ................. 74/335 |
| 6,561,052 B2 | * | 5/2003 | Kayano et al. ............... 74/339 |
| 6,655,226 B2 | * | 12/2003 | Oguri ......................... 74/333 |
| 2003/0056612 A1 | * | 3/2003 | Katakura ..................... 74/335 |
| 2003/0089582 A1 | * | 5/2003 | Sunaga et al. .............. 198/832 |

FOREIGN PATENT DOCUMENTS

JP 2002-349646 12/2002

* cited by examiner

Primary Examiner—Saul Rodriguez
Assistant Examiner—David D. Le
(74) Attorney, Agent, or Firm—Arent Fox, PLLC

(57) ABSTRACT

A power transmission system is provided which can prevent a feeling of inertia travel due to torque transmission interruption occurring when a dog clutch is engaged to shift the speed position, without increasing the axial length of a transmission. An input shaft is connected to a prime mover via a main clutch. Gear pairs are formed by input and output gears arranged on the input shaft and output shafts, respectively. A dog clutch connects one of the gear pairs to the input or output shaft. An auxiliary shaft is connected to the prime mover. Transmission paths are formed on the auxiliary shaft for transmitting the driving force of the prime mover to the output shaft at different gear ratios. In shifting the speed position, an assist clutch supplies the driving force to the output shaft via the auxiliary shaft and a selected transmission path.

14 Claims, 10 Drawing Sheets

POWER TRANSMISSION SYSTEM

BACKGROUND OF THE INVENTION

1. Field of the Invention

This invention relates to a power transmission system for transmitting a driving force of a prime mover to driving wheels via a stepped transmission.

2. Description of the Prior Art

Conventionally, a power transmission system of the above-mentioned kind has been proposed e.g. by Japanese Laid-Open Patent Publication (Kokai) No. 2000-65199. The power transmission system includes a five-forward-speed transmission having first to fifth speed input gears arranged on an input shaft thereof which is connected to an engine, in the mentioned order from the engine side, and first to fifth speed output gears arranged on an output shaft thereof, in constant mesh with the respective first to fifth speed input gears. These first to fifth speed input and output gears form first to fifth speed gear pairs, respectively. Further, the first and second speed output gears are rotatably supported on the output shaft, and a synchromesh is arranged on the output shaft between the two gears. The synchromesh is selectively put into meshing engagement with and disengagement from one of the first and second speed output gears, to connect and disconnect the one of the output gears to and from the output shaft, whereby the speed position of the transmission is set to the first speed position or the second speed position. Similarly, the third and fourth speed input gears are rotatably supported on the input shaft, and another synchromesh is arranged on the input shaft between the two gears. The synchromesh selectively connects and disconnects one of the third and fourth speed input gears to the input shaft, whereby the speed position of the transmission is set to the third speed position or the fourth speed position.

On the other hand, the fifth speed input gear is rotatably supported on the input gear, and connected/disconnected to and from the input shaft by a shift clutch. The shift clutch is of a hydraulic type the engagement force of which is controllable. The shift clutch is arranged on an end portion of the input shaft on a side remote from the engine, and further, a shift cylinder for controlling the shift clutch is arranged at a location outward of the shift clutch. When the speed position of the transmission is set to the fifth speed position, the hydraulic pressure of the shift cylinder is maximized, whereby the shift clutch is completely engaged. On the other hand, in conducting up-shifting operations within a shift range up to the fourth speed using the synchromeshes, the hydraulic pressure of the shift cylinder is reduced to a smaller value to allow the shift clutch to slide, whereby part of engine torque is transmitted and supplied to the output shaft as supplemental or compensating torque. In general, in torque transmission by a synchromesh alone, the transmitted torque is reduced to zero or a value close to zero during a time period from completion of synchronization of the synchromesh to establishment of complete meshing engagement thereof. The above control operation for the shift clutch is conducted to prevent this phenomenon of "torque transmission interruption" from giving the driver a feeling of inertia travel which is peculiar to the synchromesh.

However, in the conventional power transmission system, it is necessary to arrange the hydraulic shift clutch and the shift cylinder for actuating the same on the input shaft along the same in addition to the synchromeshes so as to prevent the driver from having the inertia travel feeling during an up-shifting operation, which increases the length of the transmission in a direction along the input shaft and hence makes it impossible to make the transmission and the power transmission system including the same compact in size. Further, the supply of the supplemental torque to the output shaft is effected via the fifth gear pair, and therefore, particularly when the transmission is changed between lower speed positions, the supplemental torque becomes short, causing a large torque step, which adversely affects the performance of the transmission.

SUMMARY OF THE INVENTION

It is an object of the invention to provide a power transmission system which is capable of positively preventing a feeling of inertia travel from being caused by torque transmission interruption which conventionally occurs when a dog clutch is engaged in shifting the speed position of a transmission, without increasing the axial length of the transmission, thereby improving the speed position-shifting performance of the transmission.

To attain the above object, the present invention provides a power transmission system for transmitting a driving force of a prime mover to driving wheels via a stepped transmission, the stepped transmission including:

a main clutch, an input shaft connected to the prime mover via the main clutch, an output shaft connected to the driving wheels, a plurality of gear pairs for at least three speed positions of the stepped transmission, each formed by an input gear arranged on the input shaft, and an output gear arranged on the output shaft and in mesh with the input gear, with one gear -of the input gear and the output gear being rotatably supported on the input shaft or the output shaft, a connecting/disconnecting clutch of a meshing engagement type, for selectively connecting and disconnecting the one gear of the input gear and the output gear of each of the plurality of gear pairs to and from the input shaft or the output shaft rotatably supporting the one gear, to thereby establish a speed position of the stepped transmission by a connected one of the gear pairs including the connected one gear, and a driving force assist mechanism for supplying the driving force of the prime mover to the output shaft when a shift in speed position is carried out by the connecting/disconnecting clutch, wherein the driving force assist mechanism comprises:

an auxiliary shaft arranged in parallel with the input shaft and the output shaft and connected to the prime mover;

a plurality of transmission paths provided on the auxiliary shaft and connected to the output shaft, for transmitting the driving force of the prime mover to the output shaft at respective different gear ratios; and an assist clutch for selecting one of the plurality of transmission paths during the shift in speed position to thereby supply the driving force of the prime mover to the output shaft via the auxiliary shaft and the selected one of the plurality of transmission paths.

According to this power transmission system, a plurality of gear pairs for at least three speed positions are each formed by an input gear arranged on an input shaft connected to the prime mover via a main clutch, and an output gear arranged on an output shaft connected to driving wheels and in mesh with the input gear, and these gear pairs are selectively connected/disconnected by a connecting/disconnecting clutch of a meshing engagement type, to establish a speed position of the transmission by the connected one of the gear pairs. Further, an auxiliary shaft of a driving force assist mechanism is connected to the prime mover and arranged in parallel with the input shaft and the output shaft, and the driving force of the prime mover is transmitted to the auxiliary shaft. In shifting the speed position using the connecting/disconnecting clutch, an assist clutch of the driving force assist mechanism selects one of the plurality of transmission paths, whereby the driving force transmitted to the auxiliary shaft is transmitted to the output shaft via the selected one of the transmission paths for supplemental supply.

As described above, according to the power transmission system, in shifting the speed position of the transmission using the connecting/disconnecting clutch, the driving force of the prime mover is transmitted to the output shaft via the auxiliary shaft connected to the prime mover and the transmission path selected by the assist clutch for supplemental supply. Therefore, the connecting/disconnecting clutch is connected i.e. put into meshing engagement, under the condition of the supplemental driving force being supplied, so that even if transmission of the driving force (torque) via the connecting/disconnecting clutch is interrupted during the connecting operation thereof, it is possible to prevent the driver from having the feeling of inertial travel. Further, the transmission paths are formed by a plurality of transmission paths which can transmit the driving force of the prime mover at respective different gear ratios to the output shaft, and depending on the selected transmission path, the magnitude of supplemental torque supply can be set to one of a plurality of levels. Therefore, by selecting an appropriate transmission path according to a destination speed position to which the transmission is to be shifted, just an appropriate amount of the driving force (torque) can be supply. As a result, it is possible to suppress a torque step during the shift in speed position, and improve the speed position-shifting performance of the transmission.

Preferably, the auxiliary shaft extends along a different axis than respective axes of the input shaft and the output shaft, and the assist clutch is arranged on the auxiliary shaft.

According to this preferred embodiment, since the auxiliary shaft extends along a different axis than respective axes of the input shaft and the output shaft, and the assist clutch is arranged on the auxiliary shaft, it is possible to suppress an increase in the axial length of the transmission.

Preferably, the plurality of gear pairs include a gear pair for an N-th speed position and a gear pair for an M-th speed position different from the N-th speed position, and in shifting a speed position of the stepped transmission from the N-th speed position to the M-th speed position, after the assist clutch selects the one of the plurality of transmission paths such that the one enables transmission of the driving force from the prime mover to the output shaft at a gear ratio approximately equal to a gear ratio at which the gear pair for the M-th speed position transmits the driving force, the connecting/disconnecting clutch effects the disconnection of the gear pair for the N-th speed position, and then effects the connection of the gear pair for the M-th speed position, and thereafter the assist clutch cancels the selection of the one of the plurality of transmission paths.

According to this preferred embodiment, in shifting the speed position of the transmission from the N-th speed position to the M-th speed position, after one of the transmission paths is selected, the gear pair for the N-th speed position is disconnected, and then the gear pair for the M-th speed is connected. Therefore, the gear pair for the M-th speed position can be connected under the condition of the supplemental torque being positively supplied to the output shaft via the selected transmission path. Therefore, even during an up-shift which particularly tends to cause the driver to have the feeling of inertia travel, it is possible to positively prevent the feeling from being given to the driver.

Further, since one of the transmission paths is selected which is capable of transmitting the torque (driving force) from the prime mover to the output shaft at a gear ratio approximately equal to a gear ratio at which the gear pair for the M-th speed position transmits the torque, it is possible to control the gear ratio of the transmission during supplemental supply of the torque to approximately the same as that of the gear ratio of the M-th speed position. Therefore, the engaging operation of the connecting/disconnecting clutch can be carried out under the condition of small differences in torque and rotational speed between the input or output gear of the gear pair for the M-th speed position and the input shaft or output shaft which are to be connected to each other. This reduces the torque load on the connecting/disconnecting clutch, and hence it is possible to reduce the torque capacity of the clutch, and at the same time, reduce the time taken for a shift in speed position, thereby further improving the speed position-shifting performance of the transmission.

Preferably, the plurality of gear pairs include a gear pair for an N-th speed position and a gear pair for an M-th speed position different from the N-th speed position, and in shifting a speed position of the stepped transmission from the N-th speed position to the M-th speed position, after the assist clutch selects the one of the plurality of transmission paths such that the one enables transmission of the driving force from the prime mover to the output shaft at a gear ratio approximately equal to a gear ratio at which the gear pair for the M-th speed position transmits the driving force, the main clutch is disconnected, and the connecting/disconnecting clutch effects the disconnection of the gear pair for the N-th speed position and then effects the connection of the gear pair for the M-th speed position, then, the main clutch being connected, and thereafter the assist clutch canceling the selection of the one of the plurality of transmission paths.

According to this preferred embodiment, the connecting/disconnecting clutch performs the operation of disconnecting the gear pair for the N-th speed position and the operation of connecting the gear pair for the M-th speed position under the condition of the input shaft being disconnected from the prime mover by the main clutch. Therefore, the clutch can carry out the disconnecting and connecting operations without receiving torque load from the prime mover, so that torque load applied to the connecting/disconnecting clutch can be further reduced.

Preferably, the plurality of gear pairs include a gear pair for an N-th speed position and a gear pair for an M-th speed position different from the N-th speed position, and in shifting a speed position of the stepped transmission from the N-th speed position to the M-th speed position, after the assist clutch selects the one of the plurality of transmission paths such that the one enables transmission of the driving force from the prime mover to the output shaft at a gear ratio smaller than a gear ratio at which the gear pair for the M-th speed position transmits the driving force, the connecting/disconnecting clutch effects the disconnection of the gear pair for the N-th speed position, and then effects the connection of the gear pair for the M-th speed position, and thereafter the assist clutch cancels the selection of the one of the plurality of transmission paths.

According to this preferred embodiment, as the transmission path connected in shifting the speed position of the transmission from the N-th speed position to the M-th speed position, one of the transmission paths is selected which is capable of transmitting the driving force from the prime mover to the output shaft at a gear ratio smaller a gear ratio at which the gear pair for the M-th speed position transmits the driving force. Therefore, when the gear pair for the M-th speed position is connected, the assist clutch always experiences a differential rotational speed to produce friction torque, which makes it possible to smoothly carry out the connecting operation of the connecting/disconnecting clutch and secure a feeling of acceleration.

Preferably, the plurality of gear pairs include a gear pair for an N-th speed position and a gear pair for an M-th speed position different from the N-th speed position, and in shifting a speed position of the stepped transmission from the N-th speed position to the M-th speed position, after the assist clutch selects the one of the plurality of transmission paths such that the one enables transmission of the driving force from the prime mover to the output shaft at a gear ratio smaller than a gear ratio at which the gear pair for the M-th speed position transmits the driving force, the main clutch is disconnected, and the connecting/disconnecting clutch effects the disconnection of the gear pair for the N-th speed position and then effects the connection of the gear pair for the M-th speed position, then, the main clutch being connected, and thereafter the assist clutch canceling the selection of the one of the plurality of transmission paths.

According to this preferred embodiment, the advantageous effects obtained by the immediately preceding two preferred embodiments can be obtained at a time. More specifically, it is possible to perform the operation of disconnecting the gear pair for the N-th speed position and the operation of connecting the M-th speed position under the condition of the main clutch being disconnected, without receiving torque load from the prime mover, thereby reducing the torque load applied to the connecting/disconnecting clutch, and at the same time positively carrying out the speed position-changing operation. Further, in shifting the speed position, by selecting a transmission path capable of transmitting the driving force at a gear ratio smaller a gear ratio at which the gear pair for the M-th speed position transmits the driving force, it is possible to smoothly carry out the connecting operation of the connecting/disconnecting clutch and secure a feeling of acceleration.

Preferably, the plurality of transmission paths are paths via a plurality of auxiliary gears which are rotatably arranged on the auxiliary shaft and connected to the output shaft, and have respective different numbers of gears teeth.

Preferably, the plurality of transmission paths are paths connected to the output shaft via a planetary gear mechanism capable of outputting a selected one of two outputs at respective different gear ratios in response to one input.

The above and other objects, features, and advantages of the invention will become more apparent from the following detailed description taken in conjunction with the accompanying drawings.

DESCRIPTION OF THE PREFERRED EMBODIMENTS

Figure 1:
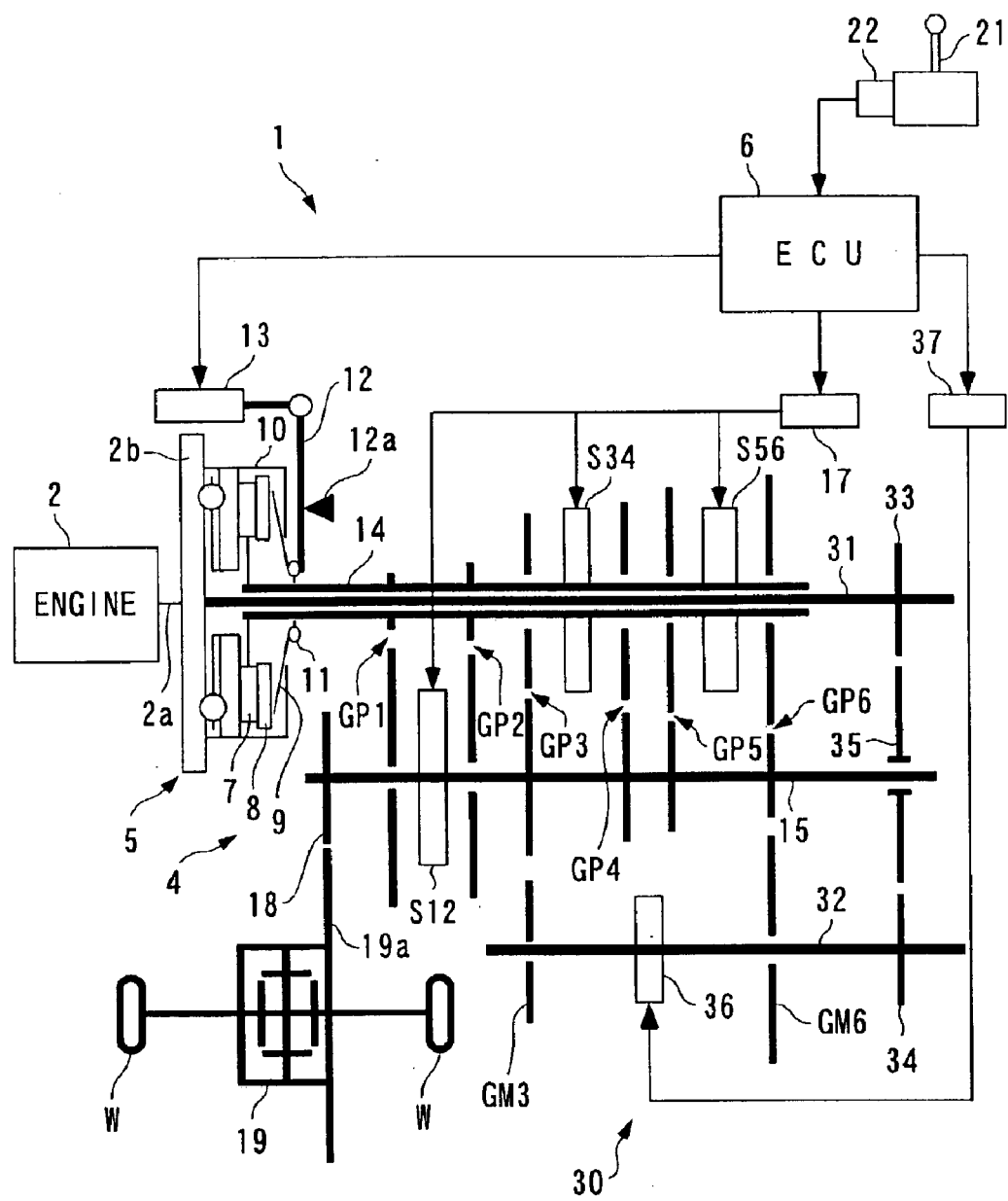
FIG. 1 is a view schematically showing the arrangement of a power transmission system to which the invention is applied and a vehicle incorporating the same.

The invention will now be described in detail with reference to the drawings showing preferred embodiments thereof. Referring first to FIG. 1, there is schematically shown the arrangement of a power transmission system to which the present invention is applied and a vehicle incorporating the same. The power transmission system 1 transmits a torque (driving force) from the engine 2 as a prime mover to driving wheels W, W while changing the rotational speed, and includes a stepped transmission 4, a main clutch 5 for connecting/disconnecting between the engine 2 and the transmission 4, and an ECU 6 controlling operations of devices including the transmission 4 and the main clutch 5.

The main clutch 5 includes a friction disk 7, a pressure disk 8, and a diaphragm spring 9, which are arranged in the mentioned order between a flywheel 2b connected to a crankshaft 2a of the engine 2 and the transmission 4. The friction disk 7 is slidably supported on one end of a hollow input shaft 14 of the transmission 4. The diaphragm spring 9 has a central portion thereof supported by a clutch cover 10 and an inner periphery thereof connected to a release bearing 11 slidably mounted on the input shaft 14. Further, the diaphragm spring 9 has an outer periphery thereof held in contact with the pressure disk 8 for urging the same toward the friction disk 7. Connected to the release bearing 11 is one end of a release fork 12 which has an intermediate portion thereof pivotally supported by a fulcrum 12a and the other end thereof connected to a main actuator 13.

Due to the construction described above, when the main actuator 13 is not in operation, the friction disk 7 is held in a state firmly sandwiched between the pressure disk 8 and the flywheel 2b by the urging force of the diaphragm spring 9. As a result, the input shaft 14 of the transmission 4 is connected to the crankshaft 2a of the engine 2 via the friction disk 7 and the flywheel 2b, whereby the main clutch 5 is held in an engaged state. On the other hand, when the main actuator 13 operates, the release fork 12 is pivotally moved about the fulcrum 12a in a clockwise direction, as viewed in the figure, to press the release bearing 11 against the diaphragm spring 9. As a result, the diaphragm spring 9 is resiliently deformed to move in a direction away from the pressure disk 8, so that the friction disk 7 is released from the sandwiched state, whereby the input shaft 14 of the transmission 4 and the crankshaft 2a of the engine 2 are disconnected from each other to bring the main clutch 5 into a disengaged state.

The main actuator 13 is of a hydraulic type or an electric type, and the operation thereof is controlled by a control signal from the ECU 6. The main actuator 13 is actuated not only at the start of the vehicle but also when a shift in speed position is carried out by the transmission 4, as referred to hereinafter, whereby the main clutch 5 is controlled to the disengaged state during the start of the vehicle and during the shift in speed position of the transmission 4. The main clutch 5 is held in the engaged state at the other times.

The transmission 4 is of an automatic type in which shifting operation is controlled by the ECU 6 according to the shift position of a shift lever 21, etc. The transmission 4 includes the input shaft 14 as a main shaft, an output shaft 15 as a counter shaft, first to sixth speed gear pairs GP1 to GP6 (hereinafter generically referred to as "the gear pairs GP") for forward drive of the vehicle, a reverse gear shaft, not shown, and a reverse gear train, not shown. The input shaft 14, the output shaft 15, and the reverse gear shaft extend in parallel with each other. Further, the transmission 4 is provided with a torque assist mechanism 30 (driving force assist mechanism) for supplying the torque of the engine 2 to the output shaft 15 during an up-shifting operation of the transmission 4.

Figure 2:
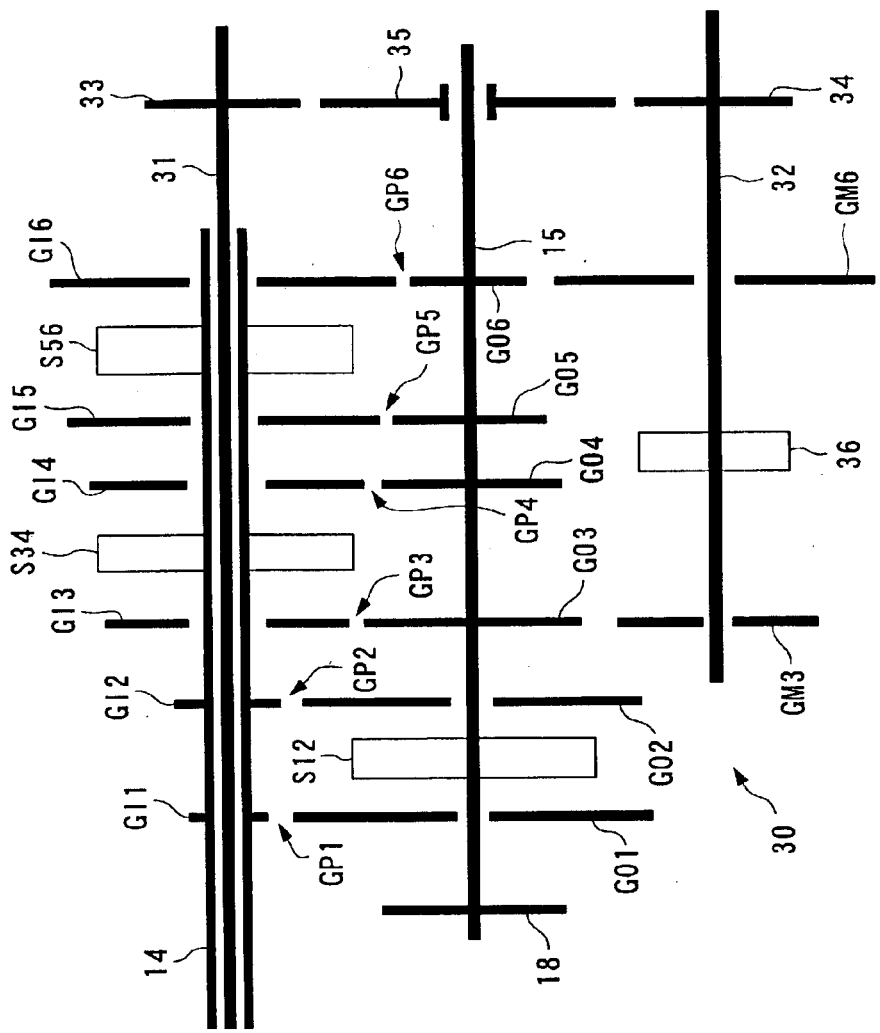
FIG. 2 is a diagram showing a portion of the FIG. 1 power transmission system on an enlarged scale.

The first to sixth speed gear pairs GP1 to GP6 are arranged in the mentioned order from the engine side. Further, as shown on an enlarged scale in FIG. 2, the first to sixth speed gear pairs GP1 to GP6 are comprised of first to sixth speed input gears GI1 to GI6 arranged on the input shaft 14, and first to sixth speed output gears GO1 to GO6 arranged on the output shaft 15, which are in constant mesh with the first to sixth speed input gears GI1 to GI6, respectively. The gear ratios of the respective gear pairs GP1 to GP6 are set such that as a gear pair is of a higher speed position, the gear ratio thereof is a smaller predetermined ratio. In the following, the construction of each of the gear pairs will be sequentially described from a lower speed position side.

The first and second speed input gears GI1, GI2 of the first and second speed gear pairs GP1, GP2 are integrally formed with the input shaft 14, while the first and second speed output gears GO1, GO2 of the same are rotatably fitted on the output shaft 15. Between the first and second speed output gears GO1, GO2, there is arranged a first/second speed synchromesh S12 for selectively switching the speed position of the transmission 4 to the first speed position and the second speed position.

This first/second speed synchromesh S12 (connecting/disconnecting clutch) has a known construction, and a third/fourth speed synchromesh S34, a fifth/sixth speed synchromesh S56, and an assist clutch 36 of the torque assist mechanism 30, all of which are referred to hereinafter, also have the same construction as that of the first/second speed synchromesh S12. Therefore, as a representative of these, the construction and operation of the first/second speed synchromesh S12 will be described hereafter with reference to FIGS. 3 and 4A to 4D. Further, the first/second speed synchromesh S12 has its right and left halves constructed symmetrically between the first and the second speed output gears GO1 and GO2.

Figure 3:
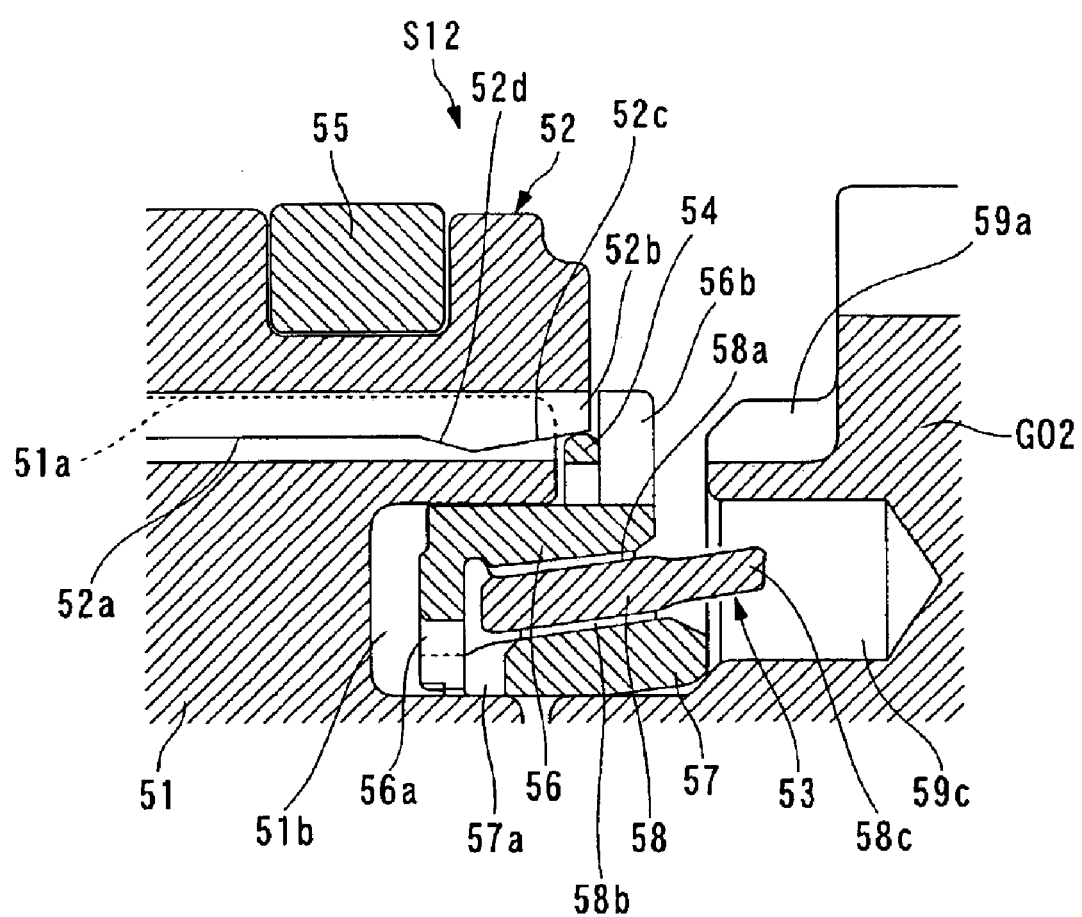
FIG. 3 is a partial cross-sectional view showing the construction of a synchromesh.
Figure 4A:
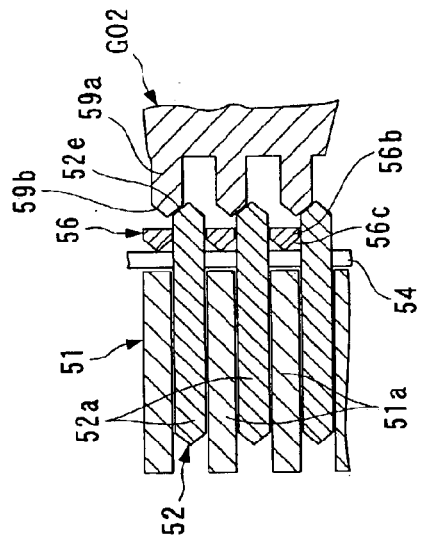
FIGS. 4A to 4D are views useful in explaining operations of the synchromesh.
Figure 4B:
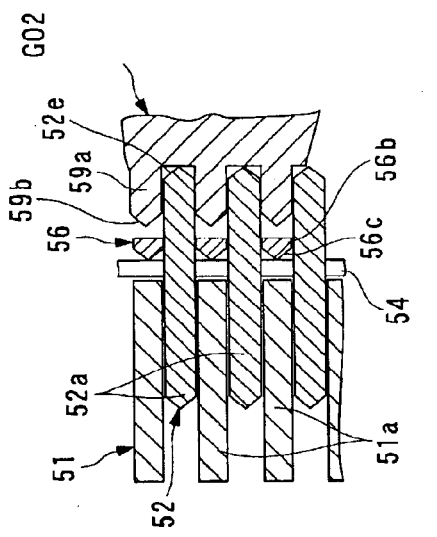
Figure 4C:
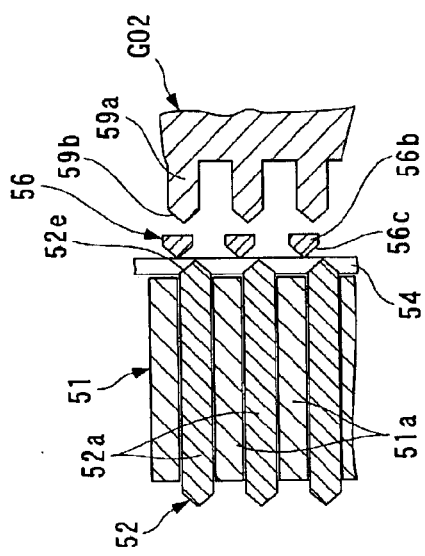
Figure 4D:
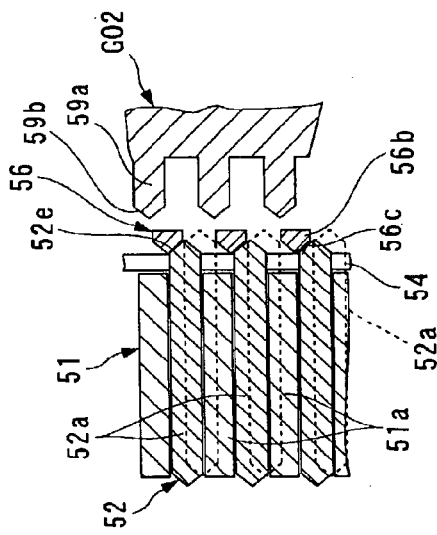

As shown in FIG. 3, the first/second speed synchromesh S12 includes a hub 51 splined to the output shaft 15 and having lots of spline teeth 51a axially extending on an outer peripheral surface thereof, an annular sleeve 52 having an inner peripheral surface thereof formed with lots of spline teeth 52a, and axially slidable along the hub 51 by meshing engagement between the spline teeth 51a and 52a, a blocking ring 53 received in a recess 51b formed in an axial end face of the hub 51, and a synchro-spring 54 arranged on the outer peripheral surface of the blocking ring 53.

A shift fork 55 is fitted on the outer peripheral surface of the sleeve 52. The shift fork 55 is actuated by a shift actuator 17 (see FIG. 1) connected thereto, to actuate the sleeve 52 in the axial direction with respect to the hub 51. The spline teeth 52a as portions of the sleeve 52 are each formed with a protrusion 52b protruding radially inward from an axial end thereof. Each protrusion 52b has a radially inner surface thereof continuously formed with first and second slopes 52c, 52d in the mentioned order from the axial end face of the sleeve 52.

The blocking ring 53 is comprised of an outer ring 56 arranged at a location radially outward, an inner ring 57 arranged at a location radially inward, and a tapered cone 58 interposed between the two rings 56, 57. The outer ring 56 and the inner ring 57 are formed with locking pieces 56a, 57a, respectively, and locked to each other by engagement between the locking pieces 56a, 57a inhibiting relative rotation of the two rings 56, 57. The tapered cone 58 has outer and inner peripheral surfaces formed as tapered surfaces 58a, 58b, respectively. The inner peripheral surface of the outer ring 56 is rotatably held in contact with the tapered surface 58a, while the outer peripheral surface of the inner ring 57 is rotatably held in contact with the tapered surface 58b.

The outer ring 56 has an axial end portion thereof formed with lots of dog teeth 56b (see FIGS. 4A to 4D) each projecting radially outward, while the second speed output gear GO2 opposed to the dog teeth 56b also has an end portion thereof formed with lots of dog teeth 59a (see FIGS. 4A to 4D). These dog teeth 56b, 59a are formed in a manner meshable with the spline teeth 52a of the sleeve 52. Further, as shown in FIGS. 4A to 4D, the spline teeth 52a of the sleeve 52 each have an end formed with an inclined surface portion 52e, while each dog tooth 56b of the outer ring 56 and each dog tooth 59a of the second speed output gear GO2 have respective ends thereof formed with inclined surface portions 56c and 59b with which the inclined surface portion 52e can be brought into contact. The tapered cone 58 is formed with protrusions 58c protruding outward in the axial direction. The protrusions 58c are loosely fitted in respective recesses 59c formed in the second speed output gear GO2.

The synchro-spring 54 is supported by a plurality of spring supporting portions, not shown, formed at circumferentially spaced intervals on the outer peripheral surface of the outer ring 56. As shown in FIG. 3, when the sleeve 52 is in a neutral position, the synchro-spring 54 is surrounded by the dog teeth 56b of the outer ring 56, the axial end face of the hub 51, and the axial end portions of the respective spline teeth 52a of the sleeve 52.

According to the construction described above, when the sleeve 52 is in the neutral position as shown in FIG. 3, the respective protrusions 52b of its spline teeth 52a are not in contact with the synchro-spring 54, and hence the urging force of the synchro-spring 54 does not act on the outer ring 56. Consequently, the outer and inner rings 56 and 57 of the blocking ring 53 are in a state relatively rotatable with respect to the tapered cone 58 of the same. Therefore, while the outer ring 56 and the inner ring 57 rotate in unison with the hub 51, the tapered cone 58 rotates in unison with the second speed output gear GO2, so that synchronizing operation does not occur between the sleeve 52 and hence the output shaft 15 and the second speed output gear GO2 (see FIG. 4A).

When the sleeves 52 is slid from the above position toward the second speed output gear GO2 by the shift fork 55 actuated by the shift actuator 17, the first slope 52c of the sleeve 52 urges and moves the outer ring 56 of the blocking ring 53 via the synchro-spring 54 toward the second speed output gear GO2. Further, the inclined surface portion 52e of each spline tooth 52a of the sleeve 52 is brought into a state pressed by the inclined surface portion 56c of the corresponding dog tooth 56b of the outer ring 56 (see FIG. 4B), whereby a large frictional force is generated between the outer and inner rings 56 and 57 of the blocking ring 53 and the tapered cone 58 of the same. In this state, synchronizing operation is performed between the output shaft 15 and the second speed output gear GO2.

Then, when the synchronizing operation is completed, the difference in rotational speed between the output shaft 15 and the second speed output gear GO2 is reduced to zero, so that rotations of the output shaft 15 and the second speed output gear GO2 are made synchronous with each other, whereupon the resistance of the blocking ring 53 to the movement of the sleeve 52 is reduced or disappears. As a result, the spline teeth 52a of the sleeve 52 are each entered between dog teeth 56b, 56b of the outer ring 56 (see broken lines in FIG. 4B). Further, each spline tooth 52a is brought into abutment on the inclined surface portion 59b of the corresponding dog tooth 59a of the second speed output gear GO2 (see FIG. 4C), and then fitted between the dog tooth 59a and an adjacent dog tooth 59a (see FIG. 4D). This causes the second speed output gear GO2 and the output shaft 15 to be completely united with each other, whereby the second speed gear pair GP2 is placed in the connected state, which establishes the second speed position of the transmission 4. It should be noted that during a time period from completion of the synchronization between the blocking ring 53 and the second speed output gear GO2 to the time point the spline teeth 52a of the sleeve 52 are each brought into abutment with the inclined surface portion 59b of the corresponding dog tooth 59a of the second speed output gear GO2 (i.e. between the state indicated by the broken lines in FIG. 4B and the state shown in FIG. 4C), a frictional force between the blocking ring 53 and the second speed output gear GO2 is reduced or disappears, and hence torque transmitted to the output shaft 15 is reduced to zero or a value close to zero.

Although not shown, when the sleeve 52 is slid toward the first speed output gear GO1 (left-hand side as viewed in FIG. 3), in quite the same manner as the above operation, the spline teeth 52a of the sleeve 52 are brought into meshing engagement with the dog teeth 59a of the first speed output gear GO1 after completion of synchronization between the blocking ring 53 and the first speed output gear GO1. This causes the first speed output gear GO1 and the output shaft 15 to be completely united with each other, whereby the first speed gear pear GP1 is placed in the connected state. In this case, the transmission 4 is set to the first speed position. Further, when the sleeve 52 is held in the neutral position, the first and second speed gear pairs GP1 and GP2 are both held in the disconnected state.

It should be noted that the shift actuator 17 for actuating the sleeve 52 is of a hydraulic or an electric type, and the operation thereof is controlled by the ECU 6. Further, during the synchronizing operation in which the spline teeth 52a of the sleeve 52 are pressed against the respective dog teeth 56b of the blocking ring 53 for the synchronization, the pressing load can be controlled to control the amount of torque to be transmitted from the input shaft 14 to the output shaft 15 via the first/second speed synchromesh S12. This pressing load is also controlled by the ECU 6 via the shift actuator 17. The first/second speed synchromesh S12, and the other synchromeshes S34 and S56, referred to hereinafter, will be generically referred to as "the synchromeshes S".

Inversely to the arrangement of the above first and second speed gear pairs GP1, GP2, the third and fourth speed gear pairs GP3 and GP4 have a third speed input gear GI3 and a fourth speed input gear GI4, respectively, each of which is rotatably fitted on the input shaft 14, and a third speed output gear GO3 and a fourth speed output gear GO4, respectively, each of which is integrally formed with the output shaft 15.

Further, the third/fourth speed synchromesh S34 (connecting/disconnecting clutch) similar in construction to the above first/second speed synchromesh S12 is arranged between the third and fourth speed input gears GI3 and GI4. Accordingly, the third/fourth speed synchromesh S34 is actuated by the shift actuator 17 to thereby selectively connect one of the third speed input gear GI3 and the fourth speed input gear GI4 to the input shaft 14 or disconnect them from the same simultaneously. Thus, the transmission 4 is set to the third or fourth speed position.

Similarly, the fifth and sixth gear pairs GP5, GP6 located next to the gear pairs GP3 and GP4 have a fifth speed input gear GI5 and a sixth speed input gear GI6, respectively, each of which is rotatably fitted on the input shaft 14, and a fifth speed output gear GO5 and a sixth speed output gear GO6, respectively, each of which is integrally formed with the output shaft 15. The fifth/sixth speed synchromesh S56 (connecting/disconnecting clutch) similar in construction to the above first/second speed synchromesh S12 is arranged between the fifth and sixth speed input gears GI5 and GI6. Accordingly, the fifth/sixth speed synchromesh S56 selectively connects one of the fifth speed input gear GI5 and the sixth speed input gear GI6 to the input shaft 14 or disconnect them from the same simultaneously. Thus, the transmission 4 is set to the fifth or sixth speed position.

It should be noted that a reverse gear train, not shown, is comprised of reverse gears, not shown, which are arranged on the input shaft 14, a reverse gear shaft, and the output shaft 15, respectively, and in meshing engagement with each other. Further, one of the reverse gears is configured to be rotatably fitted on a corresponding shaft such that the reverse gear train can be connected/disconnected by a reverse synchromesh. The transmission 4 is set to a reverse position by the reverse synchromesh.

The torque assist mechanism 30 is comprised of a first auxiliary shaft 31 (auxiliary shaft) arranged coaxially with the input shaft 14, a second auxiliary shaft 32 (auxiliary shaft) arranged outward of the output shaft 15 in parallel therewith, an idler gear 35 rotatably fitted on the output shaft 15 for meshing with driving and driven sprockets 33, 34 which are integrally formed with the first auxiliary shaft 31 and the second auxiliary shaft 32, respectively, third and sixth speed auxiliary gears GM3, GM6 (transmission paths) arranged on the second auxiliary shaft 32, an assist clutch 36 arranged on the second auxiliary shaft 32, and an assist actuator 37 of a hydraulic type, a wet multiple disk type, or an electric type for actuating the assist clutch 36.

The first auxiliary shaft 31 extending through the hollow input shaft 14 has one end thereof directly connected to the flywheel 2b of the engine 2. Further, the driving sprocket 33 is formed at the other end of the first auxiliary shaft 31, and has the same number of gear teeth as that of gear teeth of the driven sprocket 34. Therefore, the rotation of the engine 2 is always transmitted to the second auxiliary shaft 32 through the path of the first auxiliary shaft 31 directly connected to the engine 2→the driving sprocket 33→the idler gear 35→the driven sprocket 34, whereby the second auxiliary shaft 32 rotates at the same rotational speed as that of the first auxiliary shaft 31, i.e. that of the engine 2. Further, the third and sixth speed auxiliary gears GM3, GM6 have the respective same numbers of gear teeth as those of the third and sixth speed input gears GI3, GI6, and are rotatably fitted on the second auxiliary shaft 32 and in mesh with the third and sixth speed output gears GO3, GO6, respectively, with the assist clutch 36 being arranged between the auxiliary gears GM3, GM6.

The assist clutch 36 is formed by a synchromesh having the same construction as that of the synchromesh S described herein-above. Further, the assist clutch 36 is for supplying the torque of the engine 2 to the output shaft 15 during a shift in speed position of the transmission, and hence, differently from the synchromeshes S, it does not perform the meshing operation but is used only in a state in which the spline teeth 52a of the sleeve 52 are slid to be pressed against (engaged with) the dog teeth 56b of the blocking ring 53. By controlling the pressing load to vary the force of sliding engagement (degree of sliding) of the assist clutch 36, it is possible to control the magnitude of torque transmitted to the output shaft 15 and the rotational speed of the first auxiliary shaft 31. The operation of the assist clutch 36 is controlled by the ECU 6 via the assist actuator 37.

Due to the above construction, when the assist clutch 36 is operated or slid toward the third speed auxiliary gear GM3, the third speed auxiliary gear GM3 is engaged with (connected to) the second auxiliary shaft 32, whereby the torque of the engine 2 transmitted, as described above, from the first auxiliary shaft 31 to the second auxiliary shaft 32 is further transmitted from the second auxiliary shaft 32 through the path of the third speed auxiliary gear GM3 and the third speed output gear GO3, to the output shaft 15. On the other hand, when the assist clutch 36 is operated or slid toward the sixth speed auxiliary gear GM6, the sixth speed auxiliary gear GM6 is engaged with (connected to) the second auxiliary shaft 32, whereby the torque of the engine 2 transmitted to the second auxiliary shaft 32 is further transmitted to the output shaft 15 via the path of the sixth speed auxiliary gear GM6 and the sixth speed output gear GO6. Further, when the assist clutch 36 is placed in the disengaged state, the second auxiliary shaft 32 rotates without being engaged with the third speed auxiliary gear GM3 and the sixth speed auxiliary gear GM6, so that the torque of the engine 2 is not transmitted at all to the output shaft 15 via the second auxiliary shaft 32.

The output shaft 15 is integrally formed with a connection gear 18, which is in constant mesh with a gear 19a of a differential 19. Accordingly, the torque of the engine 2 is transmitted to the output shaft 15 at a gear ratio of the transmission 4, and then transmitted to the driving wheels W, W via the differential 19, to drive the driving wheels W, W for rotation.

The ECU 6 is implemented by a microcomputer comprised of a RAM, a ROM, a CPU and an input/output interface (none of which is shown). The ECU 6 drives the main actuator 13, the shift actuator 17, and the assist actuator 37, e.g. according to the shift position of the shift lever 21, which is detected by a shift position sensor 22, to thereby control the operations of the main clutch 5 and the transmission 4. Further, the ECU 6 also perform torque control of the engine 2 necessary for control of the transmission 4.

Figure 5:
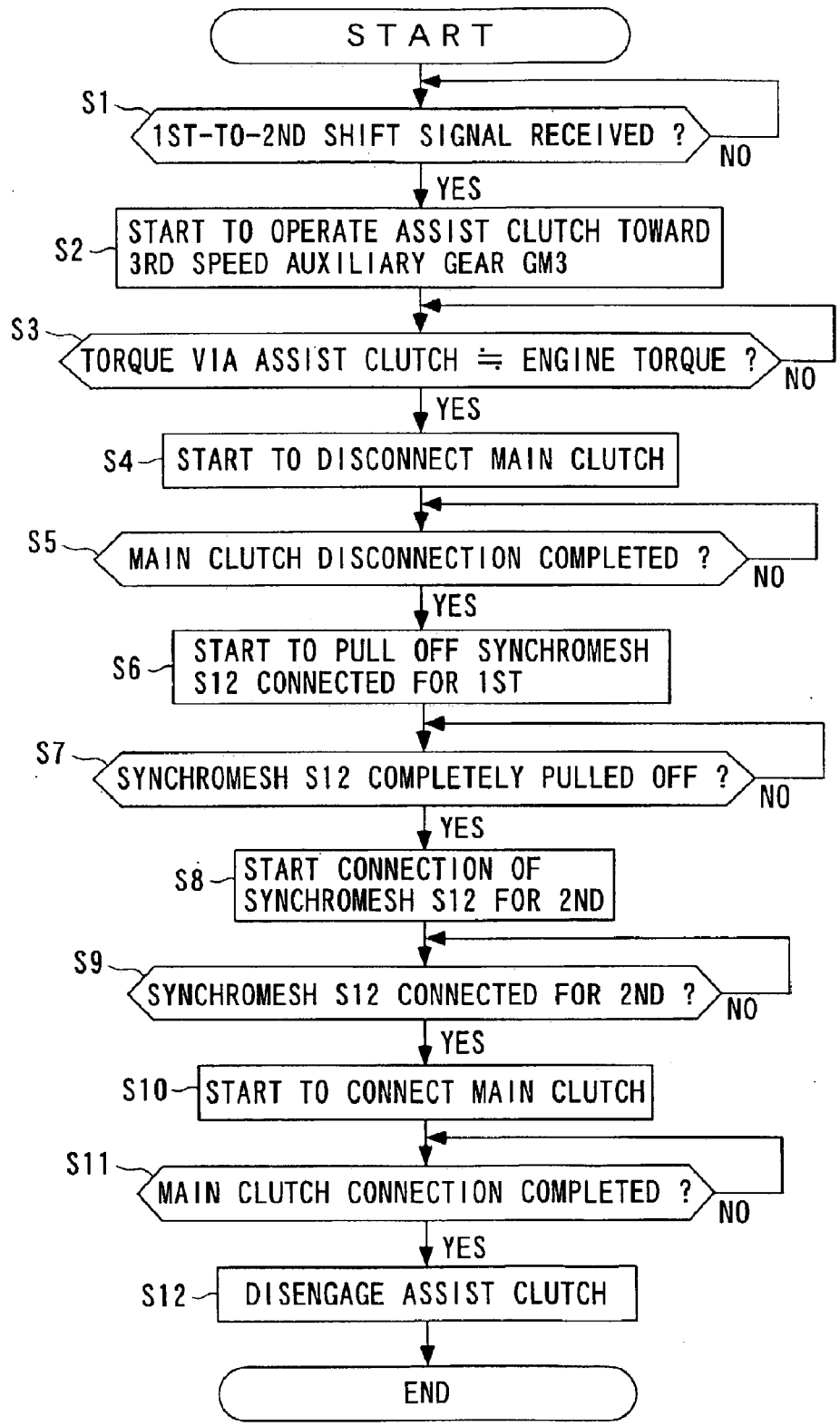
FIG. 5 is a flowchart of a supplemental torque supply process in an up-shift of the speed position from the first speed position to the second speed position.

Next, a supplemental torque supply process executed by the ECU 6 will be described with reference to FIGS. 5 and 6. The supplemental torque supply process is carried out so as to prevent the inertia travel feeling from being caused by torque transmission interruption occurring when a synchromesh comes into an engaged state during up-shifting of the speed position of the transmission 4. FIG. 5 shows a case of the speed position of the transmission 4 being up-shifted from the first speed position to the second speed position. First, it is determined in a step 1 (in the figures, shown as "S1", the other steps being also shown in the same manner) whether or not a shift signal has been delivered which instructs that the transmission 4 should be up-shifted from the first speed position (1st) to the second speed position (2nd).

Figure 6:
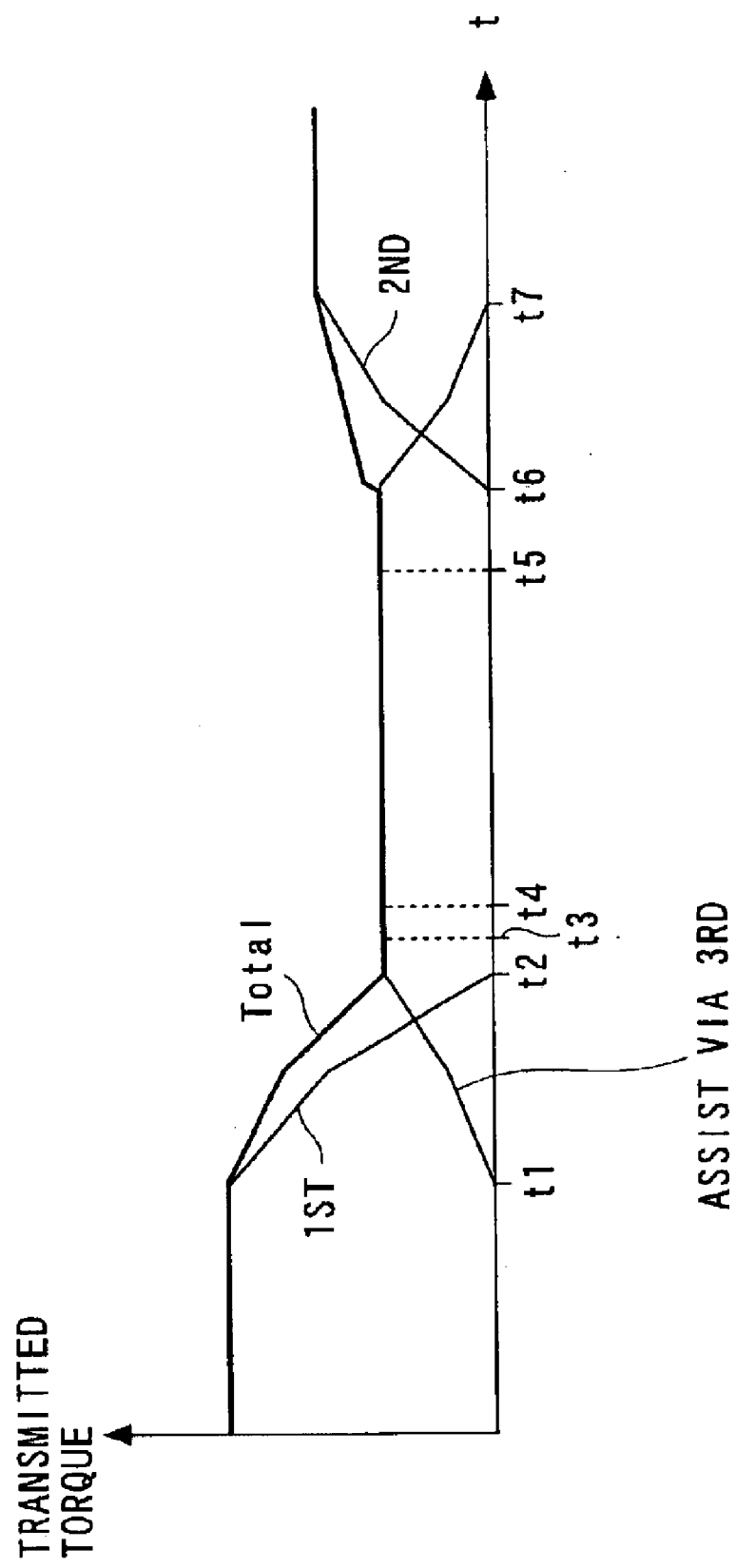
FIG. 6 is a timing chart showing an example of operations carried out according to the FIG. 5 supplemental torque supply process.

If the answer to the question is affirmative (YES), the program proceeds to a step 2, wherein a drive signal is delivered to the assist actuator 37, whereby the assist clutch 36 is operated or slid toward the third speed (3rd) auxiliary gear GM3 to start an engaging operation thereof for engagement between the gear GM3 and the auxiliary shaft 32 (time t1 in FIG. 6). This allows, while maintaining the gear ratio of the transmission set to the first speed position, the torque of the engine 2 transmitted from the first auxiliary shaft 31 to the second auxiliary shaft 32 starts to be transmitted to the output shaft 15 via the assist clutch 36, the third speed auxiliary gear GM3 and the third speed output gear GO3. The torque thus transmitted is progressively increased, and accordingly, the torque transmitted via the first/second speed synchromesh S12 is reduced (time period between t1 to t2).

Then, it is determined in a step 3 whether or not the torque transmitted via the assist clutch 36 has become approximately equal to the torque of the engine 2. When the former becomes approximately equal to the latter, in a step 4, disconnecting operation for disconnecting the main clutch 5 is started by delivering a disconnection signal to the main actuator 13 (time t2). Then, it is determined in a step 5 whether or not the disconnecting operation has been completed, and when it is completed, that is, when the input shaft 14 is completely disconnected from the engine 2, the program proceeds to a step 6, wherein the operation of pulling the sleeve 52 of the first/second speed synchromesh S12 off the first speed output gear GO1 is started so as to disconnect the first speed gear pair GP1 from the output shaft 15 (time t3).

Then, it is determined in a step 7 whether or not the pull-off operation has been completed, and if the answer to this question is affirmative (YES), the program proceeds to a step 8, wherein the connecting operation of the first/second speed synchromesh S12 toward the second speed output gear GO2 is started (time t4). This causes the synchronizing operation to be performed under the condition of the spline teeth 52a of the first/second speed synchromesh S12 being urged against the dog teeth 56b of the blocking ring 53, whereby the second speed output gear GO2 is made synchronous with the output shaft 15 (time t5). Further, after the completion of the synchronization, the spline teeth 52a of the first/second synchromesh S12 are put into meshing engagement with the dog teeth 59a of the second output gear GO2, whereby the first/second synchromesh S12 comes to be completely united with the second speed output gear GO2.

Then, it is determined in a step 9, whether or not the connecting operation of the first/second speed synchromesh S12 is completed. If the answer to this question is affirmative (YES), the connecting operation of the main clutch 5 is started in a step 10 (time t6). Subsequently, it is determined in a step 11 whether or not the connecting operation of the main clutch 5 is completed, and when it is completed, the assist clutch 36 is disengaged (engagement of the auxiliary gear GM3 with the auxiliary shaft 32 is canceled) in a step 12. This causes the torque transmitted via the assist clutch 36 to be reduced, and finally to become zero (time t7), causing the vehicle to travel at the second speed thereafter.

During the time period from the completion of the synchronization of the first/second speed synchromesh S12 to the meshing engagement of the same with the second speed output gear GO2, the spline teeth 52a are disengaged from the dog teeth 56b of the blocking ring 53, whereby the torque transmitted via the first/second speed synchromesh S12 is reduced to zero or a value close to zero. However, before this time point, the torque of the engine 2 has already come to be transmitted to the output shaft 15 via the assist clutch 36 as supplemental (or compensation) torque, so that the driver cannot sense torque transmission interruption. Thus, a feeling of inertia travel can be prevented from being given to the driver.

Figure 7:
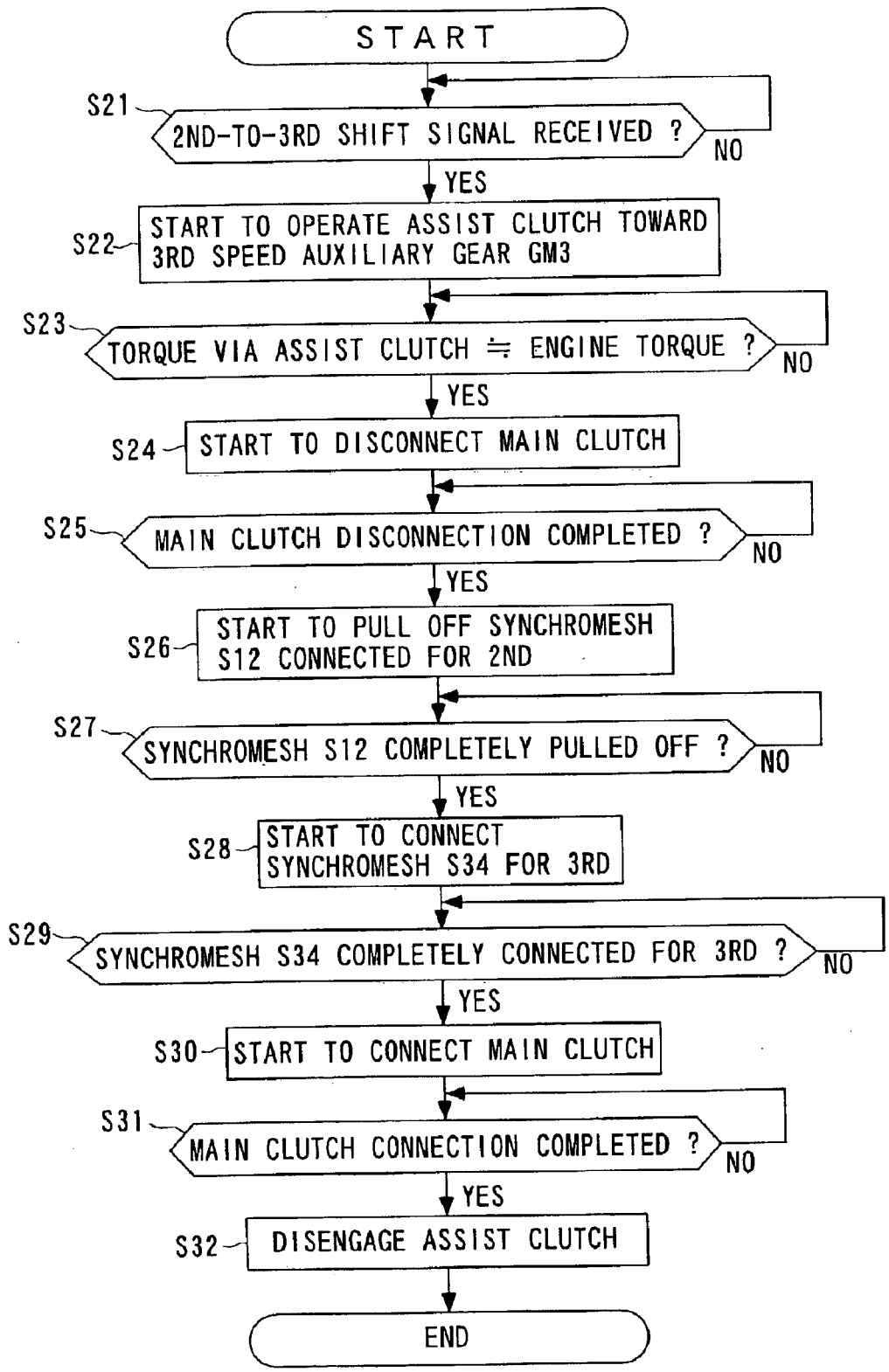
FIG. 7 is a flowchart of a supplemental torque supply process in an up-shift of the speed position from the second speed position to the third speed position.

FIG. 7 shows a supplemental torque supply process for up-shifting the speed position of the transmission 4 from the second speed position to the third speed position. As shown in the figure, this torque supply process is carried out basically in the same manner as the above torque supply process for the up-shifting from the first speed position to the second speed position. More specifically, when the speed position of the transmission 4 is to be up-shifted from the second speed position to the third speed position (YES to step 21), the assist clutch 36 is operated or slid toward the third speed auxiliary gear GM3 in a step 22, and when the torque transmitted thereby has become approximately equal to the torque of the engine 2 (YES to step 23), the main clutch 5 is disconnected in steps 24 and 25. After that, the operation of pulling the first/second synchromesh S12 off the second speed output gear GO2 is carried out in steps 26 and 27. Further, the third/fourth speed synchromesh S34 starts to be moved toward the third speed input gear GI3 in a step 28, and after completion of the synchronization of the third/fourth speed synchromesh S34, when the connecting operation of the same is terminated (YES to step 29), the main clutch 5 is connected in steps 30 and 31, and the assist clutch 36 is disengaged in a step 32, causing the vehicle to travel at the third speed thereafter.

Further, when the speed position of the transmission 4 is up-shifted from the third speed position to the fourth speed position, from the fourth speed position to the fifth speed position, or from the fifth speed position to the sixth speed position, the assist clutch 36 is slid toward the sixth speed auxiliary gear GM6 as described above, whereby the torque of the engine 2 is supplied to the output shaft 15 via the sixth speed auxiliary gear GM6 and the sixth speed output gear GO6 as supplemental torque.

As described above, according to the power transmission system of the present embodiment, in up-shifting the speed position of the transmission 4, the torque of the engine 2 is supplied as supplemental torque to the output shaft 15 via the third speed auxiliary gear GM3 or the sixth speed auxiliary gear GM6 slidingly engaged with (connected to) the second auxiliary shaft 32 by the assist clutch 36, and under this condition of torque supply, the synchromesh S is made synchronous in rotational speed, connected, and meshed. This makes it possible to positively prevent the torque transmission interruption, which causes the feeling of inertia travel, from occurring during the up-shift. Further, the synchromesh S is connected and disconnected in the state of the input shaft 14 being disconnected from the engine 2 by the main clutch 5. This makes it possible to carry out the operation of pulling off the sleeve 52 and the synchronizing operation of the sleeve 52 without difficulty, without receiving torque load from the engine 2 and without damaging the spline teeth 52a of the synchromesh S.

Further, when the speed position of the transmission 4 is up-shifted from the first speed position to the second speed position, or from the second speed position to the third speed position, the third speed auxiliary gear GM3 is used, and when the same is up-shifted from the third speed position to the fourth speed position, from the fourth speed position to the fifth speed position, or from the fifth speed position to the sixth speed position, the sixth speed auxiliary gear GM6 is used. Thus, one of the auxiliary gears having a gear ratio close to that of a destination speed position is selected to supply supplemental torque, which makes it possible to supply just an appropriate amount of the torque. As a result, it is possible to reduce a torque step during a shift in speed position of the transmission, especially between lower speed positions, to thereby improve the speed position-shifting performance of the transmission 4. Further, particularly during the up-shift from the second speed position to the third speed position and the up-shift from the fifth speed position to the sixth speed position, it is possible to control the gear ratio of the transmission 4 during supplemental supply of the torque to approximately the same as that of each destination speed position. This makes it possible to perform the connecting operation of the synchromesh S in a state of almost no difference in torque and rotational speed between the synchromesh S and a gear of an associated gear pair to be connected therewith, whereby it is possible to further reduce the torque load applied to the synchromesh S. It should be noted that the number of gear teeth of each of the third and sixth speed auxiliary gears GM3, GM6 may be slightly increased to thereby set the gear ratio of the transmission 4 during execution of the above supplemental supply of the torque to be a value slightly larger than that of the destination speed position (toward the higher speed position). Thus, when the third speed output gear GO3 or the sixth speed output gear GO6 is connected, the assist clutch 36 always experiences a differential rotational speed to produce friction torque. This makes it possible to carry out a smooth connecting operation of the synchromesh S and secure a feeling of acceleration.

When an up-shift of speed positions other than the above is carried out, the force of sliding engagement (degree of sliding) of the assist clutch 36 can be controlled such that the connecting operation of the synchromesh S is executed in a state where the rotational speed of the input shaft 14 and that of the output shaft 15 during the supply of the supplemental torque are controlled to have a relationship approximately equivalent to the gear ratio of a destination speed position. This makes it possible to perform the synchronizing operation with a reduced difference in rotational speed between the synchromesh S and a gear of an associated gear pair to be connected therewith. As a result, it is possible to further reduce the torque load applied to the synchromesh S to reduce torque capacity thereof, and shorten the time taken for the shift, thereby further improving the speed position-shifting performance of the transmission 4.

Furthermore, since the first auxiliary shaft 31 is arranged coaxially with the input shaft 14, the second auxiliary shaft 32 extends along an axis different from the respective axes of the input shaft 14 and the output shaft 15, with the remaining elements of the torque assist mechanism 30, i.e. the third and sixth speed auxiliary gears GM3, GM6 and the assist clutch 36 being arranged on the second auxiliary shaft 32, it is possible to prevent an increase in the axial length of the transmission 4. Further, as the gears for transmitting the torque of the second auxiliary shaft 32 to the output shaft 15 via the third and sixth speed auxiliary gears GM3, GM6, the existing third and sixth speed output gears GO3, GO6 of the transmission 4 are commonly used. Therefore, the number of gears of the transmission 4 can be reduced due to the common or shared use, and at the same time the axial length of the transmission 4 can be further shortened.

Figure 8:
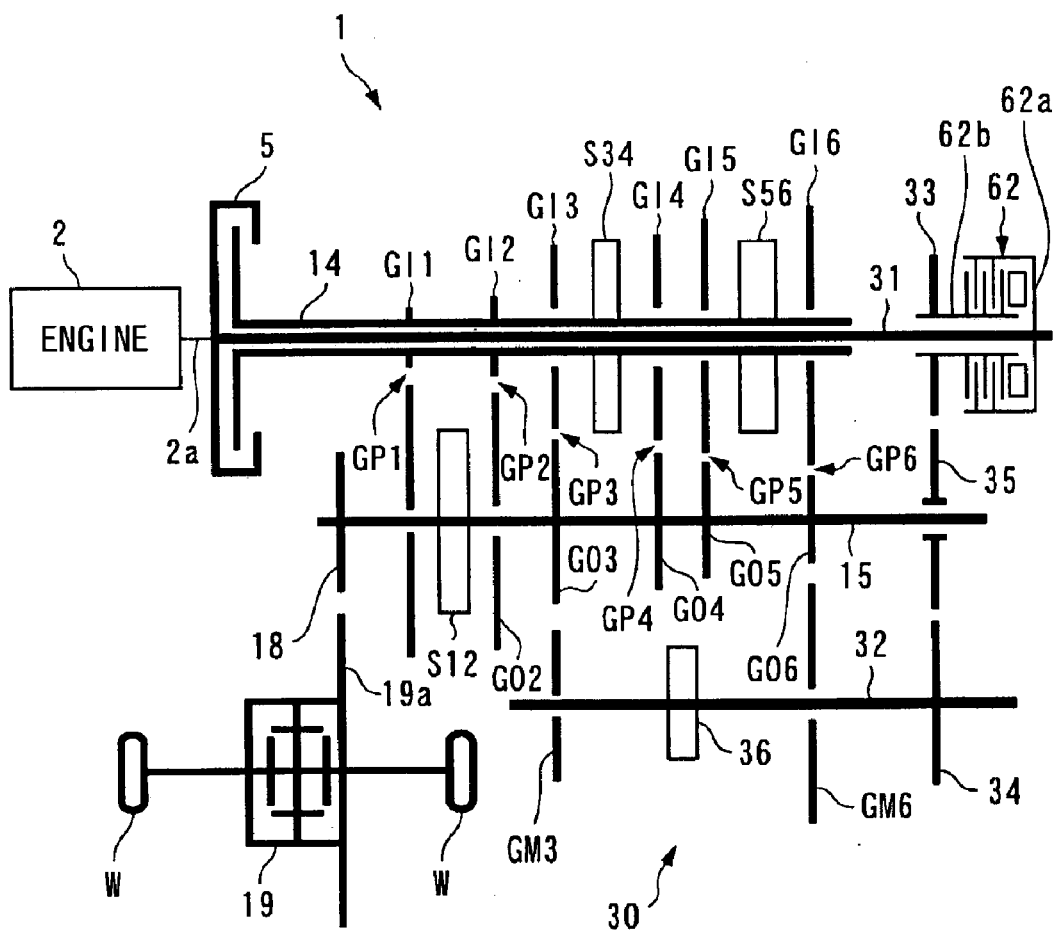
FIG. 8 is a view similar to FIG. 1, which shows a power transmission system according a second embodiment of the invention.

FIG. 8 shows a power transmission system according to a second embodiment of the invention. It should be noted that in FIG. 8, and FIGS. 9 and 10 showing third and fourth embodiments, described hereinafter, component parts and elements similar to those of the above-mentioned first embodiment are designated by identical reference numerals, and for convenience of illustration, the main clutch 5 is illustrated in a simplified manner, and the control system including the ECU 6 is omitted.

Referring to FIG. 8, the power transmission system 1 according to the second embodiment is distinguished from the first embodiment in that not only an assist clutch 36 but also a second assist clutch 62 are provided for supplemental supply of the torque of the engine 2. The second assist clutch 62 is formed by a friction clutch and has a clutch outer 62a thereof integrally connected to a first auxiliary shaft 31, and a clutch inner 62b thereof integrally connected to a driving sprocket 33. The connection/disconnection of the second assist clutch 62, and the force of sliding engagement (degree of sliding) thereof are controlled by the ECU 6. Further, the assist clutch 36 is formed by a synchromesh similar to that of the first embodiment, or a dog clutch. In the present embodiment, through meshing engagement, the assist clutch 36 carries out only a selective connection between a second auxiliary shaft 32 and a third speed auxiliary gear GM3 or between the second auxiliary shaft 32 and a sixth speed auxiliary gear GM6.

Therefore, according to the present embodiment, when a shift in speed position is carried out by a transmission 4, the second assist clutch 62 is slid for sliding engagement (connection), whereby the torque of the engine 2 is transmitted from the first auxiliary shaft 31 to the second auxiliary shaft 32, and further supplied to an output shaft 15 via the third speed auxiliary gear GM3 or the sixth speed auxiliary gear GM6 through the connection of the assist clutch 36. Further, by changing the force of sliding engagement (degree of sliding) of the second assist clutch, it is possible to control the magnitude of torque transmitted to the output shaft 15 and the rotational speed of the output shaft 15. This makes it possible to obtain quite the same advantageous effects as provided by the first embodiment.

Figure 9:
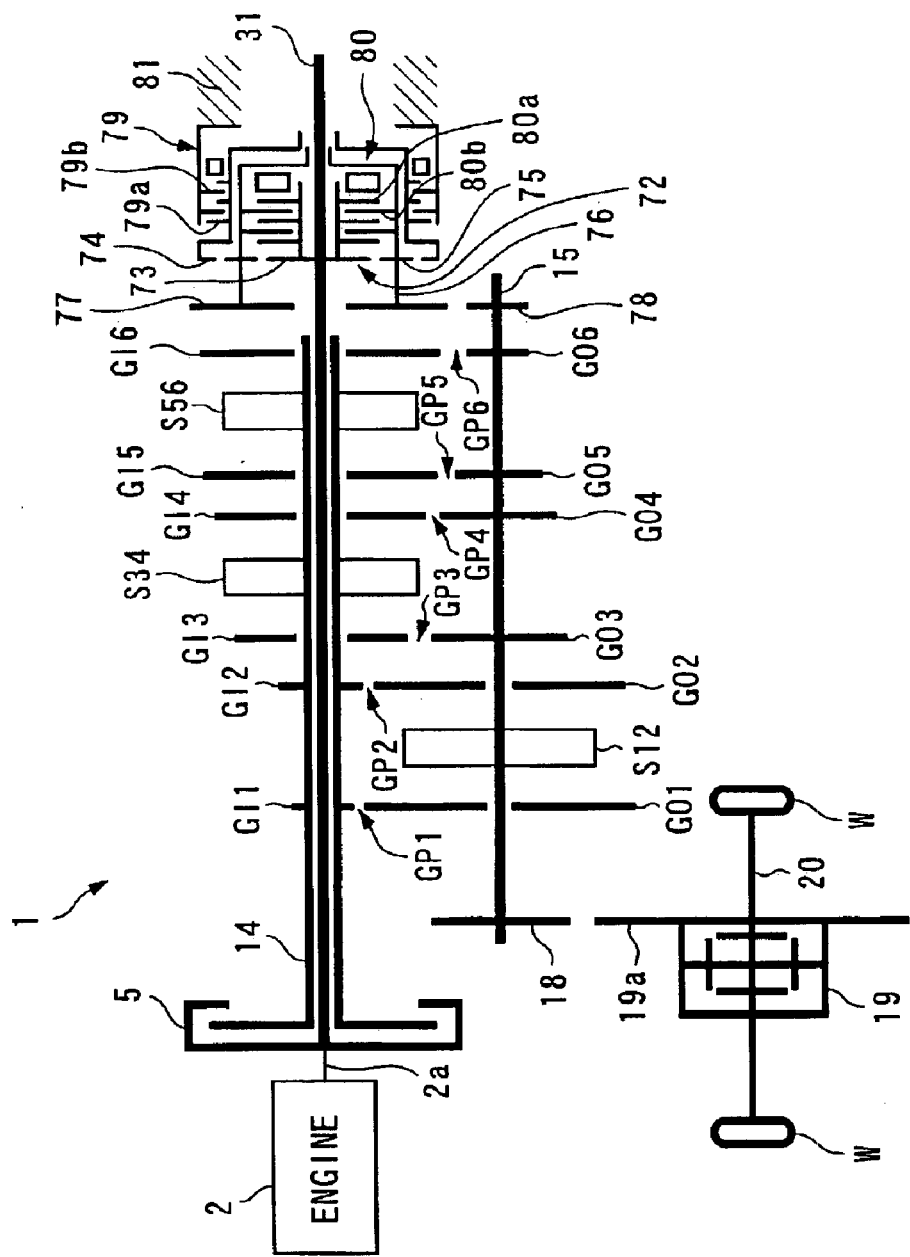
FIG. 9 is a view similar to FIG. 1, which shows a power transmission system according a third embodiment of the invention.
Figure 10:
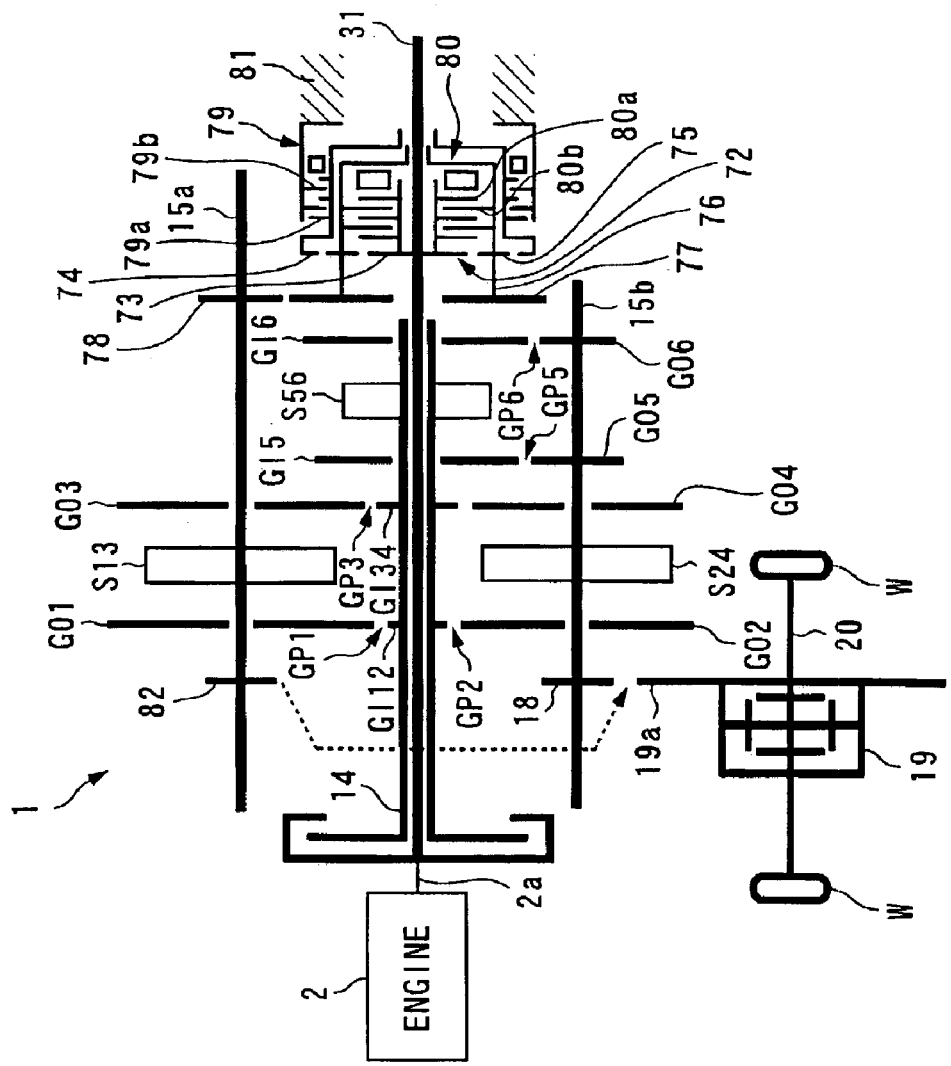
FIG. 10 is a view similar to FIG. 1, which shows a power transmission system according a fourth embodiment of the invention.

FIG. 9 shows a power transmission system according to a third embodiment of the invention. As shown in the figure, the power transmission system according to the present embodiment is distinguished from the first embodiment in that the second auxiliary shaft 32 and third and sixth speed auxiliary gears GM3, GM6 of the first embodiment are omitted, and a planetary gear mechanism 72 is used as a transmission path for the supplemental supply of the torque of the engine 2 to an output shaft 15. The planetary gear mechanism 72 is arranged at an end of a first auxiliary shaft 31, opposite to the engine 2, and comprised of a sun gear 73, a ring gear 74, and a carrier 76 for rotatably supporting a plurality of pinions 75 simultaneously meshing with the gears 73, 74. The sun gear 73 is integrally connected to the first auxiliary shaft 31, and the carrier 76 is integrally connected to a first auxiliary gear 77 which is rotatably arranged on the first auxiliary shaft 31, and meshes with a second auxiliary gear 78 integrally formed with the output shaft 15. The first and second auxiliary gears 77, 78 have a gear ratio set to be slightly smaller (forward a higher speed position) than that of a sixth speed gear pair GP6.

The ring gear 74 is integrally connected to a clutch inner 79a of a first assist clutch 79 (assist clutch), and a clutch outer 79b of the first assist clutch 79 is integrally connected a housing 81 of a transmission 4. The engaging force between the ring gear 74 and the housing 81 is adjusted by sliding engagement (connection) of the first assist clutch 79. Further, the sun gear 73 is integrally connected to a clutch inner 80a of a second assist clutch 80 (assist clutch), and the carrier 76 is integrally connected to a clutch outer 80b of the second assist clutch 80. The engaging force between the sun gear 73 and the carrier 76 is adjusted by sliding engagement (connection) of the second assist clutch 80. It should be noted that operations of the first and second assist clutches 79, 80 are controlled by an ECU 6.

In the present embodiment, during an up-shift from the first speed position to the second speed position or from the second speed position to the third speed position, the first assist clutch 79 is slid for sliding engagement (connection), and the second assist clutch 80 is held in a disengaged state. Thus, the ring gear 74 is engaged with the housing 81, whereby with rotation of the sun gear 73 connected to the first auxiliary shaft 31, the carrier 76 rotates in the same direction at a reduced rotational speed. Accordingly, the torque of the engine 2 is supplied to the output shaft 15 through the path of the first auxiliary shaft 31→the sun gear 73→the carrier 76→the first auxiliary gear 77→the second auxiliary gear 78. It should be noted that at this time, a total gear ratio from a crankshaft 2a to the output shaft 15 via the planetary gear mechanism 72 is set to be smaller (toward a higher speed position) than a total gear ratio set by the engagement of a third speed gear pair GP3, and the output torque of the first auxiliary gear 77 is adjusted by the force of sliding engagement of the first assist clutch 79.

Further, during an up-shift from the third speed position to the fourth speed position, from the fourth speed position to the fifth speed position, or from the fifth speed position to the sixth speed position, the first assist clutch 79 is held in a disengaged state, while the second assist clutch 80 is slid for sliding engagement (connection). This causes the carrier 76 to be engaged with the sun gear 73 to receive a holding force therefrom to thereby rotate in the same direction in which the sun gear 73 rotates. As a result, the torque of the engine 2 is transmitted to the output shaft 15 at a gear ratio equal to the gear ratio of the first and second auxiliary gears 77, 78 in a state adjusted by the second assist clutch 80. As described hereinabove, since the gear ratio between the first and second auxiliary gears 77, 78 is set to a slightly smaller value than that of the sixth speed gear pair GP6, a total gear ratio from the crankshaft 2a to the output shaft 15 at this time is smaller (toward a higher speed position) than a total gear ratio set by the engagement of the sixth speed gear pair GP6. It should be noted that except during a shift in speed position of the transmission, both of the first and second assist clutches 79, 80 are disengaged to cause the planetary gear mechanism 72 only to freely rotate without exerting any adverse influence on the transmission and supplemental supply of the engine torque.

As described above, according to the present embodiment, one of the torque transmission paths available by the planetary gear mechanism 72 is selected by an associated one of the first and second assist clutches 79, 80, whereby when the transmission 4 is up-shifted from the first speed position to the second speed position or from the second speed position to the third speed position, the torque of the engine 2 is transmitted and supplied to the output shaft 15 at a gear ratio slightly higher than that of the third speed position, and when the transmission 4 is up-shifted from the third speed position to the fourth speed position, from the fourth speed position to the fifth speed position, or from the fifth speed position to the sixth speed position, the torque of the engine 2 is transmitted and supplied to the output shaft 15 at a gear ratio slightly higher than that of the sixth speed position. This makes it possible to obtain quite the same advantageous effects as provided by the first embodiment.

FIG. 10 shows a power transmission system according to a fourth embodiment of the invention. As shown in the figure, the power transmission system 1 according to the present embodiment is mainly distinguished from the third embodiment in that the output shaft is formed by first and second output shafts 15*a*, 15*b*. The first and second output shafts 15*a*, 15*b* are arranged in parallel with each other on opposite sides of an input shaft 14.

On the first output shaft 15*a* are rotatably fitted first and third speed output gears GO1, GO3, and a first/third speed synchromesh S13 is arranged between the output gears GO1, GO3. Further, a second speed output gear GO2 is rotatably fitted on the second output shaft 15*b* at a location corresponding to the first speed output gear GO1. A first/second speed input gear GI12 is integrally formed with the input shaft 14 and in mesh with the output gears GO, GO2. In short, the first/second speed input gear GI12 is shared by a first speed gear pair GP1 and a second speed gear pair GP2. Similarly, a fourth speed output gear GO4 is rotatably fitted on the second output shaft 15*b* at a location corresponding to the third speed output gear GO3, and a third/fourth speed input gear GI34 is integrally formed with the input shaft 14 and in mesh with the output gears GO3, GO4, for shared use, thereby forming third and fourth speed gear pairs GP3, GP4. Further, fifth and sixth speed input gears GI5, GI6 are rotatably fitted on the input shaft 14, and between the input gears GI5, GI6 is arranged a fifth/sixth speed synchromesh S56. Fifth and sixth speed output gears GO5, GO6 are integrally formed with the second output shaft 15*b* and are in mesh with the input gears GI5, GI6, respectively, thereby forming fifth and sixth speed gear pairs GP5, GP6.

Similarly to the third embodiment, a planetary gear mechanism 72 has a carrier 76 integrally connected to a first auxiliary gear 77 rotatable with respect to a first auxiliary shaft 31. A second auxiliary gear 78 integrally formed the first output shaft 15*a* is in mesh with the first auxiliary gear 77. Further, the first output shaft 15*a* is integrally formed with a second connection gear 82 at a location corresponding to a connection gear 18 formed on the second output shaft 15*b*. The second connection gear 82 is in mesh with a differential gear 19. The other configurations are similar to those of the third embodiment.

The operation of the power transmission system 1 according to the present embodiment is basically the same as that of the third embodiment. More specifically, during an up-shift from the first speed position to the second speed position or from the second speed position to the third speed position, a first assist clutch 79 is slid for sliding engagement (connecting), whereby supplemental torque is supplied from the engine 2 to the first output shaft 15*a* via the first auxiliary shaft 31, the planetary gear mechanism 72, the first auxiliary gear 77, and the second auxiliary gear 78, at a gear ratio slightly smaller than a gear ratio set by the connection of the third speed gear pair GP3. The supplemental torque is then supplied to the differential gear 19 via the second connection gear 82. Further, during an up-shift from the third speed position to the fourth speed position, from the fourth speed position to the fifth speed position, or from the fifth speed position to the sixth speed position, a second assist clutch 80 is slid for sliding engagement (connection), whereby supplemental torque is supplied from the engine 2 to the first output shaft 15*a* and then to the differential gear 19 at a gear ratio slightly smaller than a gear ratio set by the connection of the sixth speed gear pair GP6.

Accordingly, in the present embodiment as well, it possible to obtain quite the same advantageous effects as provided by the third embodiment described above. Further, since the output shaft is formed by the first and second output shafts 15*a*, 15*b*, and the output gears GO are separately fitted on the output shafts 15*a*, 15*b*, it is possible to prevent an increase in the axial length of the transmission 4. Further, since the first/second speed input gear GI12 and the third/fourth speed input gear GI34 are commonly used as the first and second speed input gears and the third and fourth speed input gears, respectively, it is possible to reduce the number of gears and shorten the axial length of the transmission 4, in comparison with the third embodiment.

It should be noted that the present invention is not necessarily limited to the embodiments described above, but can be practiced in various forms. For example, although in the first embodiment, a synchromesh is used as the assist clutch 36 of the torque assist mechanism 30, this is not limitative, but any other type of clutch, e.g. of a hydraulic type, a wet multiple disk type, or an electric type, or further a multi-tapered clutch as used in a synchronizer may be employed so long as it has a capability of being slid for operation since the assist clutch 36 is used in a slid state. Further, although in the first and second embodiments, as the auxiliary gears for transmitting supplemental torque from the second auxiliary shaft 32 to the output shaft 15, there are provided the third and sixth speed auxiliary gears GM3, GM6, this is not limitative, but such auxiliary gears may be provided for respective speed positions, i.e. for the second to sixth speed positions. Further, by setting the number of gear teeth of an auxiliary gear differently from that of gear teeth of an input gear connected thereto, the gear ratio of a path of transmission of torque from the input shaft to the output shaft for assisting torque supply may be set independently.

Further, although in the above embodiments, during up-shifts, to reduce the torque load from the engine 2 to the synchromesh S and enhance the marketability of the transmission 4, the synchromesh S is disconnected and connected for supply of supplemental torque, with the main clutch 5 being held in the disengaged state, this is not limitative, but of course the above operations may be carried out with the main clutch 5 being in the engaged state. Further, although in the above embodiments, operations for up-shifting the speed position of the transmission 4 are described by way of example, operations for down-shifting the speed position of the transmission 4 can be performed in the same manner as the up-shifting operations.

It is further understood by those skilled in the art that the foregoing is a description of preferred embodiments of the invention, and that various changes and modifications may be made without departing from the spirit and scope thereof.

What is claimed is:

1. A power transmission system for transmitting a driving force of a prime mover to driving wheels via a stepped transmission, said stepped transmission including:

a main clutch, an input shaft connected to the prime mover via said main clutch, an output shaft connected to the driving wheels, a plurality of gear pairs for at least three speed positions of said stepped transmission, each formed by an input gear arranged on said input shaft, and an output gear arranged on said output shaft and in mesh with said input gear, with one gear of said input gear and said output gear being rotatably supported on said input shaft or said output shaft, a connecting/disconnecting clutch of a meshing engagement type, for selectively connecting and disconnecting said one gear of said input gear and said output gear of each of said plurality of gear pairs to and from said input shaft or said output shaft rotatably supporting said one gear, to thereby establish a speed position of said stepped transmission by a connected one of said gear pairs including said connected one gear, and a driving force assist mechanism for supplying the driving force of the prime mover to said output shaft when a shift in speed position is carried out by said connecting/disconnecting clutch, wherein said driving force assist mechanism comprises:

an auxiliary shaft arranged in parallel with said input shaft and said output shaft and connected to the prime mover;

a plurality of transmission paths provided on said auxiliary shaft and connected to said output shaft, for transmitting the driving force of the prime mover to said output shaft at respective different gear ratios; and an assist clutch for selecting one of said plurality of transmission paths during the shift in speed position to thereby supply the driving force of the prime mover to said output shaft via said auxiliary shaft and the selected one of said plurality of transmission paths.

2. A power transmission system according to claim 1, wherein said plurality of gear pairs include a gear pair for an N-th speed position and a gear pair for an M-th speed position different from the N-th speed position, and wherein in shifting a speed position of said stepped transmission from the N-th speed position to the M-th speed position, after said assist clutch selects the one of said plurality of transmission paths such that the one enables transmission of the driving force from the prime mover to said output shaft at a gear ratio approximately equal to a gear ratio at which said gear pair for the M-th speed position transmits the driving force, said connecting/disconnecting clutch effects the disconnection of said gear pair for the N-th speed position, and then effects the connection of said gear pair for the M-th speed position, and thereafter said assist clutch cancels the selection of the one of said plurality of transmission paths.

3. A power transmission system according to claim 1, wherein said plurality of gear pairs include a gear pair for an N-th speed position and a gear pair for an M-th speed position different from the N-th speed position, and wherein in shifting a speed position of said stepped transmission from the N-th speed position to the M-th speed position, after said assist clutch selects the one of said plurality of transmission paths such that the one enables transmission of the driving force from the prime mover to said output shaft at a gear ratio approximately equal to a gear ratio at which said gear pair for the M-th speed position transmits the driving force, said main clutch is disconnected, and said connecting/disconnecting clutch effects the disconnection of said gear pair for the N-th speed position and then effects the connection of said gear pair for the M-th speed position, then, said main clutch being connected, and thereafter said assist clutch canceling the selection of the one of said plurality of transmission paths.

4. A power transmission system according to claim 1, wherein said plurality of gear pairs include a gear pair for an N-th speed position and a gear pair for an M-th speed position different from the N-th speed position, and wherein in shifting a speed position of said stepped transmission from the N-th speed position to the M-th speed position, after said assist clutch selects the one of said plurality of transmission paths such that the one enables transmission of the driving force from the prime mover to said output shaft at a gear ratio smaller than a gear ratio at which said gear pair for the M-th speed position transmits the driving force, said connecting/disconnecting clutch effects the disconnection of said gear pair for the N-th speed position, and then effects the connection of said gear pair for the M-th speed position, and thereafter said assist clutch cancels the selection of the one of said plurality of transmission paths.

5. A power transmission system according to claim 1, wherein said plurality of gear pairs include a gear pair for an N-th speed position and a gear pair for an M-th speed position different from the N-th speed position, and wherein in shifting a speed position of said stepped transmission from the N-th speed position to the M-th speed position, after said assist clutch selects the one of said plurality of transmission paths such that the one enables transmission of the driving force from the prime mover to said output shaft at a gear ratio smaller than a gear ratio at which said gear pair for the M-th speed position transmits the driving force, said main clutch is disconnected, and said connecting/disconnecting clutch effects the disconnection of said gear pair for the N-th speed position and then effects the connection of said gear pair for the M-th speed position, then, said main clutch being connected, and thereafter said assist clutch canceling the selection of the one of said plurality of transmission paths.

6. A power transmission system according to claim 1, wherein said plurality of transmission paths are paths via a plurality of auxiliary gears which are rotatably arranged on said auxiliary shaft and connected to said output shaft, and have respective different numbers of gears teeth.

7. A power transmission system according to claim 1, wherein said plurality of transmission paths are paths connected to said output shaft via a planetary gear mechanism capable of outputting a selected one of two outputs at respective different gear ratios in response to one input.

8. A power transmission system according to claim 1, wherein said auxiliary shaft extends along a different axis than respective axes of said input shaft and said output shaft, and wherein said assist clutch is arranged on said auxiliary shaft.

9. A power transmission system according to claim 8, wherein said plurality of gear pairs include a gear pair for an N-th speed position and a gear pair for an M-th speed position different from the N-th speed position, and wherein in shifting a speed position of said stepped transmission from the N-th speed position to the M-th speed position, after said assist clutch selects the one of said plurality of transmission paths such that the one enables transmission of the driving force from the prime mover to said output shaft at a gear ratio approximately equal to a gear ratio at which said gear pair for the M-th speed position transmits the driving force, said connecting/disconnecting clutch effects the disconnection of said gear pair for the N-th speed position, and then effects the connection of said gear pair for the M-th speed position, and thereafter said assist clutch cancels the selection of the one of said plurality of transmission paths.

10. A power transmission system according to claim 8, wherein said plurality of gear pairs include a gear pair for an N-th speed position and a gear pair for an M-th speed position different from the N-th speed position, and wherein in shifting a speed position of said stepped transmission from the N-th speed position to the M-th speed position, after said assist clutch selects the one of said plurality of transmission paths such that the one enables transmission of the driving force from the prime mover to said output shaft at a gear ratio approximately equal to a gear ratio at which said gear pair for the M-th speed position transmits the driving force, said main clutch is disconnected, and said connecting/disconnecting clutch effects the disconnection of said gear pair for the N-th speed position and then effects the connection of said gear pair for the M-th speed position, then, said main clutch being connected, and thereafter said assist clutch canceling the selection of the one of said plurality of transmission paths.

11. A power transmission system according to claim 8, wherein said plurality of gear pairs include a gear pair for an N-th speed position and a gear pair for an M-th speed position different from the N-th speed position, and wherein in shifting a speed position of said stepped transmission from the N-th speed position to the M-th speed position, after said assist clutch selects the one of said plurality of transmission paths such that the one enables transmission of the driving force from the prime mover to said output shaft at a gear ratio smaller than a gear ratio at which said gear pair for the M-th speed position transmits the driving force, said connecting/disconnecting clutch effects the disconnection of said gear pair for the N-th speed position, and then effects the connection of said gear pair for the M-th speed position, and thereafter said assist clutch cancels the selection of the one of said plurality of transmission paths.

12. A power transmission system according to claim 8, wherein said plurality of gear pairs include a gear pair for an N-th speed position and a gear pair for an M-th speed position different from the N-th speed position, and wherein in shifting a speed position of said stepped transmission from the N-th speed position to the M-th speed position, after said assist clutch selects the one of said plurality of transmission paths such that the one enables transmission of the driving force from the prime mover to said output shaft at a gear ratio smaller than a gear ratio at which said gear pair for the M-th speed position transmits the driving force, said main clutch is disconnected, and said connecting/disconnecting clutch effects the disconnection of said gear pair for the N-th speed position and then effects the connection of said gear pair for the M-th speed position, then, said main clutch being connected, and thereafter said assist clutch canceling the selection of the one of said plurality of transmission paths.

13. A power transmission system according to claim 8, wherein said plurality of transmission paths are paths via a plurality of auxiliary gears which are rotatably arranged on said auxiliary shaft and connected to said output shaft, and have respective different numbers of gears teeth.

14. A power transmission system according to claim 8, wherein said plurality of transmission paths are paths connected to said output shaft via a planetary gear mechanism capable of outputting a selected one of two outputs at respective different gear ratios in response to one input.

* * * * *